(12) United States Patent  
Trinkenschuh et al.

(10) Patent No.: US 11,396,226 B2  
(45) Date of Patent: Jul. 26, 2022

(54) HYBRID MODULE HAVING A ROTARY FEEDTHROUGH

(71) Applicant: Schaeffler Technologies AG & Co. KG, Herzogenaurach (DE)

(72) Inventors: Andreas Trinkenschuh, Bühl (DE); Steffen Lehmann, Ettlingen (DE); Dirk Hofstetter, Durmersheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/631,373

(22) PCT Filed: Jul. 5, 2018

(86) PCT No.: PCT/DE2018/100615  
§ 371 (c)(1),  
(2) Date: Jan. 15, 2020

(87) PCT Pub. No.: WO2019/015714  
PCT Pub. Date: Jan. 24, 2019

(65) Prior Publication Data  
US 2020/0215897 A1    Jul. 9, 2020

(30) Foreign Application Priority Data

Jul. 18, 2017  (DE) .......................... 102017116195.3  
Nov. 20, 2017  (DE) .......................... 102017127217.8

(51) Int. Cl.  
*F16D 21/06*    (2006.01)  
*B60K 6/387*    (2007.10)  
(Continued)

(52) U.S. Cl.  
CPC .............. *B60K 6/387* (2013.01); *F16D 21/06* (2013.01); *B60K 6/48* (2013.01);  
(Continued)

(58) Field of Classification Search  
CPC ..... F16D 2021/0669; F16D 2021/0661; F16D 25/0638; F16D 25/081; F16D 25/10;  
(Continued)

(56) References Cited

U.S. PATENT DOCUMENTS 8,453,817 B2 * 6/2013 Schrage ................. B60K 6/405  
192/48.611  
8,978,799 B2   3/2015 Arnold et al.  
(Continued)

FOREIGN PATENT DOCUMENTS

CN   103206469 A  *  7/2013  ............. F16D 25/10  
CN   105485309 A  *  4/2016  ............... B60K 6/48  
(Continued)

OTHER PUBLICATIONS

Unpublished Patent Application DE 102017104487 filed Mar. 3, 2017 titled "Hybridmodul für ein Kraftfahrzeug sowie Antriebsstrang mit Hybridmodul" and assigned to Schaeffler Technologies AG & CO KG.

*Primary Examiner* — Stacey A Fluhart

(57) ABSTRACT

A hybrid module for a drive train of a motor vehicle includes a dual clutch which has a first sub-clutch and a second sub-clutch for selectively transmitting torque from a first drive unit to a drive shaft. The hybrid module further includes a disconnect clutch for coupling a second drive unit and for transmitting torque from the second drive unit to the drive shaft. At least one rotary feedthrough is provided which is configured on one hand for conveying actuating oil, which is designed for actuation of the disconnect clutch, or on the other hand for conveying cooling oil, which is designed for cooling the disconnect clutch and/or the dual clutch.

8 Claims, 3 Drawing Sheets

(51) Int. Cl.
*B60K 6/48* (2007.10)
*F16D 25/0638* (2006.01)
*F16D 25/10* (2006.01)

(52) U.S. Cl.
CPC ... *B60K 2006/4825* (2013.01); *B60Y 2200/92* (2013.01); *F16D 25/0638* (2013.01); *F16D 25/10* (2013.01); *F16D 2021/0661* (2013.01)

(58) Field of Classification Search
CPC ......... F16D 21/06; B60K 6/87; B60K 6/4825; B60K 6/387; B60Y 2200/92
USPC ...................................................... 192/48.611
See application file for complete search history.

(56) References Cited

U.S. PATENT DOCUMENTS

| | | | | |
|---|---|---|---|---|
| 10,634,196 | B2* | 4/2020 | Jeong | F16D 13/52 |
| 2004/0206599 | A1* | 10/2004 | Hegerath | F16D 21/06 |
| | | | | 192/48.611 |
| 2005/0082136 | A1* | 4/2005 | Braford | F16D 21/06 |
| | | | | 192/48.91 |
| 2007/0205070 | A1* | 9/2007 | Bauer | F16D 25/10 |
| | | | | 192/55.61 |
| 2010/0326785 | A1* | 12/2010 | Schrage | B60K 6/48 |
| | | | | 192/70.12 |
| 2012/0132498 | A1* | 5/2012 | Hauck | F16D 25/082 |
| | | | | 192/48.601 |
| 2017/0261045 | A1* | 9/2017 | Chamberlin | F16D 25/123 |
| 2017/0324290 | A1* | 11/2017 | Chamberlin | H02K 7/10 |

FOREIGN PATENT DOCUMENTS

| | | | |
|---|---|---|---|
| DE | 10018926 | A1 | 11/2000 |
| DE | 102007003107 | A1 | 8/2007 |
| DE | 102007060165 | A1 | 6/2009 |
| DE | 102009059944 | A1 | 7/2010 |
| DE | 102009030135 | A1 | 12/2010 |
| DE | 102011100256 | A1 | 10/2012 |
| DE | 102012022290 | A1 | 5/2014 |
| DE | 102014014669 | A1 | 4/2016 |
| DE | 102014014669 | A1 * | 4/2016 ............... B60K 6/48 |
| DE | 102017116232 | | 7/2018 |
| FR | 2814121 | A1 | 3/2002 |
| JP | 2003-014090 | A | 1/2003 |
| JP | 2010516558 | A | 5/2010 |
| JP | 2011007326 | A | 1/2011 |
| JP | 2012036926 | A | 2/2012 |
| WO | 2017088869 | A1 | 6/2017 |
| WO | WO-2018041443 | A1 * | 3/2018 ............ B60W 10/02 |

* cited by examiner

HYBRID MODULE HAVING A ROTARY FEEDTHROUGH

CROSS-REFERENCE TO RELATED APPLICATIONS

This application is the U.S. National Phase of PCT Appln. No. PCT/DE2018/100615 filed Jul. 5, 2018, which claims priority to DE 10 2017 127 217.8 filed Nov. 20, 2017 and DE 10 2017 116 195.3 filed Jul. 18, 2017, the entire disclosures of which are incorporated by reference herein.

TECHNICAL FIELD

The disclosure relates to a hybrid module for a drive train of a motor vehicle, having a dual clutch which has a first sub-clutch (K1) and a second sub-clutch (K2) for selectively transmitting torque from a first drive unit, in particular an electric machine, to a drive shaft, and a disconnect clutch (K0) for coupling a second drive unit, in particular an internal combustion engine, to the drive train and for transmitting torque from the second drive unit to the drive shaft. Thus, when the first sub-clutch is closed, the torque from the first drive unit is transmitted to a first drive shaft, while the torque from the first drive unit is transmitted to a second drive shaft when the second sub-clutch is closed. The second drive unit can be selectively connected, that is to say coupled and uncoupled, to the drive train via the disconnect clutch.

BACKGROUND

Such hybrid modules having a dual clutch and a disconnect clutch are already known from the prior art. For example, WO 2017/088 869 A1 discloses a hybrid module for a motor vehicle for the coupling of an internal combustion engine, having a disconnect clutch by means of which the internal combustion engine can be disconnected from a drive train of the motor vehicle and by means of which torque from the internal combustion engine can be transferred to the drive train, having an electric motor which for torque transmission can be connected to the drive train via a main clutch, wherein a disconnect clutch actuating system is used to effect actuation of the disconnect clutch and a main clutch actuating system is used to effect actuation of the main clutch, characterized in that the two actuating systems are arranged between the disconnect clutch and the main clutch.

A hybrid module is also known inter alia from non-prepublished application DE 10 2017 104 487. That application discloses a hybrid module for a drive train of a motor vehicle, having an electric machine comprising a stator and a rotor, a torsional vibration damper having at least one rotary part, and an integrated clutch device in the form of a dual clutch, wherein a rotor carrier receiving the rotor is connected directly via a permanent rotary connection to the at least one rotary part, wherein the rotor carrier forms a clutch component at least of a sub-clutch of the coupling device.

However, the prior art always has the disadvantage that high pressing forces or actuating forces are required for torque transmission. This has the result that, in the case of clutch actuation via a conventional clutch slave cylinder (CSC), an actuating bearing, that is to say an engagement or release bearing, of the slave cylinder must be designed for the high actuating forces. In addition, a support bearing for the bearing of the first drive unit, in particular a rotor of the first drive unit, must then support the actuating forces in addition to the bearing forces.

SUMMARY

Accordingly, the object of the disclosure is to avoid or at least reduce the disadvantages of the prior art. In particular, an improved hybrid module is to be developed which is capable of transmitting high actuating forces for actuation of the clutches and at the same time is optimized in terms of installation space and can be produced inexpensively.

In a generic device, the object of the disclosure is achieved according to the disclosure in that there is present in the hybrid module at least one rotary feedthrough which is configured on the one hand for conveying actuating oil, which is designed for actuating the disconnect clutch, or on the other hand for conveying cooling oil, which is designed for cooling the disconnect clutch and/or the dual clutch.

This has the advantage that it is possible to transmit high actuating forces which do not have to be supported in addition to the bearing forces by the support bearing for the bearing of the rotor, but a closed loop of the actuating forces is formed. At the same time, the functionality of the clutches is ensured by integral oil cooling.

Advantageous embodiments are claimed in the claims and will be explained in greater detail hereinbelow.

Moreover, it is advantageous if there is present both for the disconnect clutch and for the first sub-clutch and the second sub-clutch a rotary feedthrough for conveying actuating oil which is designed for actuation of the disconnect clutch, the first sub-clutch and/or the second sub-clutch. The advantages of actuation by supplying actuating oil via the rotary feedthrough can thus be utilized equally for the dual clutch and also for the disconnect clutch.

It is also advantageous if the rotary feedthrough for carrying actuating oil for actuating the disconnect clutch is formed in a housing and a rotor flange which is fixedly connected to a rotor carrier for the bearing of the first drive unit. The rotary feedthrough can thus be integrally implemented into already existing components without far-reaching structural changes.

It is also advantageous if the rotor flange has a receiver for a rotor position locator which is designed to indicate the position of the rotor when detected by a rotor position locator sensor.

The rotor flange can also be used to support the actuating forces of the first sub-clutch.

It is further advantageous if the disconnect clutch is in the form of a multi-disk clutch, wherein an inner disk carrier or an outer disk carrier is fixedly connected to the rotor flange. Advantageously, the force flow of the actuating forces can thereby be designed to be closed.

It is also advantageous if the other of the inner disk carrier and the outer disk carrier is connected to the second drive unit, in order to permit torque transmission.

It is further advantageous if there is present at least one oil-filled centrifugal oil compensation chamber which is so configured that the oil pressure in the centrifugal oil compensation chamber applies a force in an axial direction to an axially displaceable actuating element for actuation of the disconnect clutch, the first sub-clutch and/or the second sub-clutch, which force counteracts an actuating force of the actuating oil for actuation of the disconnect clutch, the first sub-clutch and/or the second sub-clutch. It is thus avoided in a simple manner that one of the clutches can unintentionally be, as a result of centrifugal force caused by the rotation forcing actuating oil that has remained in a pressure chamber radially outwards. The oil in the centrifugal oil compensation chamber thus counteracts this undesirable force in the axial direction.

It is additionally advantageous that the oil pressure in the centrifugal oil compensation chamber corresponds to an actuating oil pressure in a pressure chamber which is filled with actuating oil for actuation of the disconnect clutch, the first sub-clutch and/or the second sub-clutch. An equilibrium is thereby established between the centrifugal oil compensation chamber and the pressure chamber filled/to be filled with actuating oil, so that the actuating element is displaced only by application of the actuating oil pressure.

Moreover, it is advantageous if the rotary feedthrough for conveying actuating oil for actuation of the disconnect clutch is formed by a through-hole in the rotor flange, which through-hole is connected via a radially circumferential groove to an actuating oil inlet in the housing. Since the rotor flange rotates relative to the housing, it is necessary to form a circumferential groove on one of the two components in order that the through-hole in the rotor flange is connected via the groove to the actuating oil inlet in the housing in any rotational position.

It is also advantageous if the groove is connected via a through-hole in a sleeve to the actuating oil inlet in the housing. The actuating oil can thus be conveyed from the housing through a housing interior since the sleeve, which serves as a seal carrier, seals the actuating oil inlet relative to the housing interior.

It is further advantageous if a counterpressure element for supporting an actuating force for actuation of the disconnect clutch, the first sub-clutch and/or the second sub-clutch is fixedly connected to the rotor flange. A closed force flow of the actuating forces can thus be ensured, so that the actuating forces do not have to be supported by bearings used for the bearing of the clutches or of the rotor.

It is additionally advantageous if the counterpressure element for supporting the actuating force of the disconnect clutch is in the form of a support bolt, a retaining ring or a bayonet ring.

It is also advantageous if the hybrid module has a housing which supports a clutch carrier of the disconnect clutch via a support bearing, and if the actuating forces which occur on actuation of the disconnect clutch run in a closed manner via an actuating element, the disconnect clutch and the clutch carrier in such a manner that the actuating forces bypass the support bearing. This has the advantage that it is possible to transmit high actuating forces which do not have to be supported in addition to the bearing forces by the support bearing for the bearing of the rotor, but a closed loop of the actuating forces is formed.

Moreover, it is advantageous if a rotor of the first drive unit as well as the disconnect clutch, the first sub-clutch and the second sub-clutch are mounted in the axial direction and in the radial direction via the support bearing, which is in the form of a ball bearing, for example, in the housing and via a first roller bearing and a second roller bearing on the drive shaft.

In an embodiment, the first and second roller bearings can be in the form of needle bearings.

It is further advantageous if there is present a counterpressure element for clutch plates on actuation of the disconnect clutch, which counterpressure element is configured to absorb the actuating forces and which is connected to the clutch carrier, for example an inner disk carrier or an outer disk carrier.

It is also advantageous if the counterpressure element is in the form of a support bolt, a retaining ring or a bayonet ring.

The counterpressure element can thus be produced inexpensively and at the same time perform the function of a counterpressure plate for supporting the actuating forces.

An advantageous exemplary embodiment is further characterized in that the counterpressure element is connected to the clutch carrier via a tooth system. In particular, it is preferred if an outer tooth system is formed on the counterpressure element and an inner tooth system is formed on the clutch carrier, for example the inner disk carrier. The counterpressure element can thereby be connected in a rotationally fixed manner to the clutch carrier.

Moreover, it is advantageous if the counterpressure element is so configured and arranged that it fixes the support bearing in the axial direction. The counterpressure element thereby serves at the same time as an axial stop for the support bearing so that, advantageously, fewer components have to be used.

It is additionally advantageous if the actuating forces of the disconnect clutch are supported via the counterpressure element on a rotor flange which is fixedly connected to the clutch carrier, so that the force flow of the actuating forces is closed and bypasses the housing. The actuating forces thus do not have to be supported by the rotating components, such as the clutch carrier, the rotor flange or the counterpressure element, via the support bearing on the housing, since the actuating device for actuation of the disconnect clutch is mounted not in the housing but in the rotor flange.

It is also advantageous if a rotary feedthrough for conveying actuating oil, which is designed for actuation of the disconnect clutch, is present in the rotor flange. This makes it possible for the actuating device to be arranged in the rotor flange and not, as in a conventional slave cylinder, in the housing, whereby the actuating force is applied via an actuating bearing.

In an advantageous exemplary embodiment, the rotary feedthrough can convey the actuating oil into a pressure chamber which is formed between the rotor flange and the actuating element, wherein the actuating element is so configured that, when pressure is applied to the pressure chamber with actuating oil, it is displaced in the axial direction for actuation of the disconnect clutch. The force flow of the actuating forces thus advantageously remains closed, so that the actuating forces are supported on components that are fixedly connected to the rotor flange.

Moreover, it is advantageous if the rotor flange is mounted in a sliding manner in the region of the rotary feedthrough for actuation of the disconnect clutch. A supply of fluid from the housing into the rotating rotor flange can thereby advantageously be ensured.

BRIEF DESCRIPTION OF THE DRAWINGS

The disclosure will be explained hereinbelow by means of drawings, in which.

The figures are merely schematic in nature and serve only for the understanding of the disclosure. The same elements are identified by the same reference numerals.

DETAILED DESCRIPTION

Figure 1:
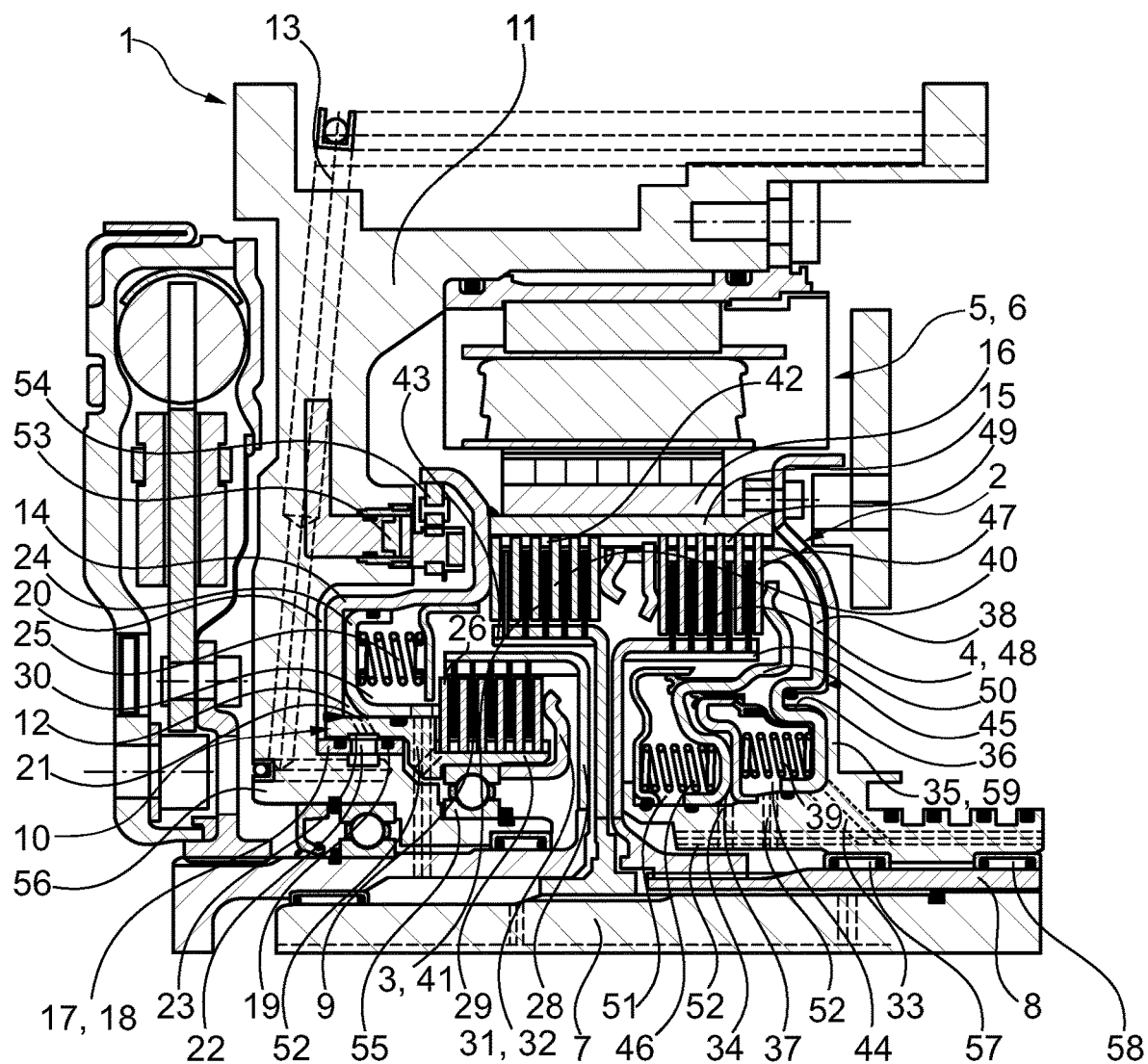
FIG. 1 is a longitudinal sectional view of a hybrid module according to the disclosure.

FIG. 1 shows a hybrid module 1 according to the disclosure for a drive train of a motor vehicle. The hybrid module 1 has a dual clutch 2 which has a first sub-clutch 3 and a second sub-clutch 4. When the first sub-clutch 3 is closed, torque from a first drive unit 5, which is in the form of an electric machine 6, is transmitted to a first drive shaft 7. When the second sub-clutch 4 is closed, the torque from the first drive unit 5 is transmitted to a second drive shaft 8. The hybrid module 1 also has a disconnect clutch 9 which is able to connect a second drive unit, which is in the form of an internal combustion engine, to the drive train so that torque from the second drive unit is transmitted to the first drive shaft 7 or to the second drive shaft 8.

In the hybrid module 1 there is a first actuating oil rotary feedthrough 10, which conveys actuating oil for actuation of the disconnect clutch 9 through a housing 11 of the hybrid module 1 into a first pressure chamber 12. For actuation of the disconnect clutch 9, the actuating oil is conveyed through a channel 13 in the housing 11. In the housing 11 there is arranged a rotor flange 14 which is fixedly connected to a rotor carrier 15. A rotor 16 of the electric machine 6 is mounted via the rotor carrier 15. From the channel 13 in the housing 11, the actuating oil for the disconnect clutch 9 is conveyed through a sleeve 17 and through the first actuating oil rotary feedthrough 10, which is formed in the rotor flange 14, into the first pressure chamber 12. The sleeve 17 serves as a seal holder 18, which holds a seal 19 for sealing the first actuating oil rotary feedthrough 10 relative to a housing interior 20. The first actuating oil rotary feedthrough 10 in the rotor flange 14 is in the form of a through-hole 21 between the first pressure chamber 12 and a through-hole 22 in the sleeve 17, wherein the through-hole 21 is connected via a radially circumferential groove 23 to the through-hole 22 in the sleeve 17.

When the first pressure chamber 12 is filled with actuating oil, a first actuating element 24 is displaced in the axial direction against the restoring force of a first spring element 25, so that clutch plates 26 of the disconnect clutch 9, which is in the form of a multi-disk clutch 27, are pressed together. Torque from an outer disk carrier 28 connected to the second drive unit is thereby transmitted to an inner disk carrier 29, which is fixedly connected to the rotor flange 14 and the rotor carrier 15. The first spring element 25 is arranged in a first centrifugal oil compensation chamber 30, which is filled with oil, in order to avoid unintentional actuation of the disconnect clutch 9 by residual actuating oil in the first pressure chamber 12 which is forced outwards in the radial direction by a centrifugal force. The first actuating element 24 thus separates the first pressure chamber 12 and the first centrifugal oil compensation chamber 30 from one another in the axial direction.

On actuation of the disconnect clutch 9, the clutch plates 26 are pressed against a counterpressure element 31, which is in the form of a support bolt 32. The support bolt 32 has an external thread via which it is connected in a rotationally fixed manner to an internal thread formed on the rotor flange 14.

In the hybrid module 1 there are present a second actuating oil rotary feedthrough 33 for conveying actuating oil for actuation of the first sub-clutch 3 and a third actuating oil rotary feedthrough 34 for conveying actuating oil for actuation of the second sub-clutch 4. The actuating oil for the two sub-clutches 3, 4 is conveyed through a housing portion 35 of the hybrid module 1 into a second pressure chamber 36 and a third pressure chamber 37. Actuation of the two sub-clutches 3, 4 takes place analogously to the actuation of the disconnect clutch 9.

By filling the second pressure chamber 36, a second actuating element 38 is displaced in the axial direction against the restoring force of a second spring element 39, so that clutch plates 40 of the first sub-clutch 3, which is in the form of a multi-disk clutch 41, are pressed together. Torque from an outer disk carrier 42 connected to the rotor carrier 15 and thus to the first drive unit 5 is thereby transmitted to an inner disk carrier 43, which is fixedly connected to the first drive shaft 7. The second spring element 39 is arranged in a second centrifugal oil compensation chamber 44, which is filled with oil, in order to avoid unintentional actuation of the first sub-clutch 3 by residual actuating oil in the second pressure chamber 36 which is forced outwards in the radial direction by a centrifugal force. The second actuating element 38 thus separates the second pressure chamber 36 and the second centrifugal oil compensation chamber 44 from one another in the axial direction. On actuation of the first sub-clutch 3, the clutch plates 40 are pressed against a counterpressure element which is formed integrally on the rotor flange 14.

By filling the third pressure chamber 37, a third actuating element 45 is displaced in the axial direction against the restoring force of a third spring element 46, so that clutch plates 47 of the second sub-clutch 4, which is in the form of a multi-disk clutch 48, are pressed together. Torque from an outer disk carrier 49 connected to the rotor carrier 15 and thus to the first drive unit 5 is thereby transmitted to an inner disk carrier 50, which is fixedly connected to the second drive shaft 8. The third spring element 46 is arranged in a third centrifugal oil compensation chamber 51, which is filled with oil, in order to avoid unintentional actuation of the second sub-clutch 4 by residual actuating oil in the third pressure chamber 37 which is forced outwards in the radial direction by a centrifugal force. The third actuating element 45 thus separates the third pressure chamber 37 and the third centrifugal oil compensation chamber 51 from one another in the axial direction. On actuation of the second sub-clutch 4, the clutch plates 47 are pressed against a counterpressure element which is fixedly connected to the rotor carrier 15.

In the rotor flange 14 and the housing portion 35 there are formed cooling oil rotary feedthroughs 52, which convey cooling oil to the disconnect clutch 9, the first sub-clutch 3 and the second sub-clutch 4 and to the centrifugal oil compensation chambers 30, 44, 51.

On the housing 11 there is arranged a rotor position locator sensor 53 which is designed to detect the position of a rotor locator 54 fixed to the rotor flange 14.

The rotor 16 is mounted together with the disconnect clutch 9, the first sub-clutch 3 and the second sub-clutch 4 by means of a support bearing 55 via the rotor flange 14 in the housing 11, in particular a housing intermediate wall 56, and by means of a first roller bearing 57 and a second roller bearing 58 via the housing portion 35, that is to say a coupling housing 59, on the second drive shaft 8. The first and the second roller bearings 57, 58 are in the form of needle bearings.

Figure 2:
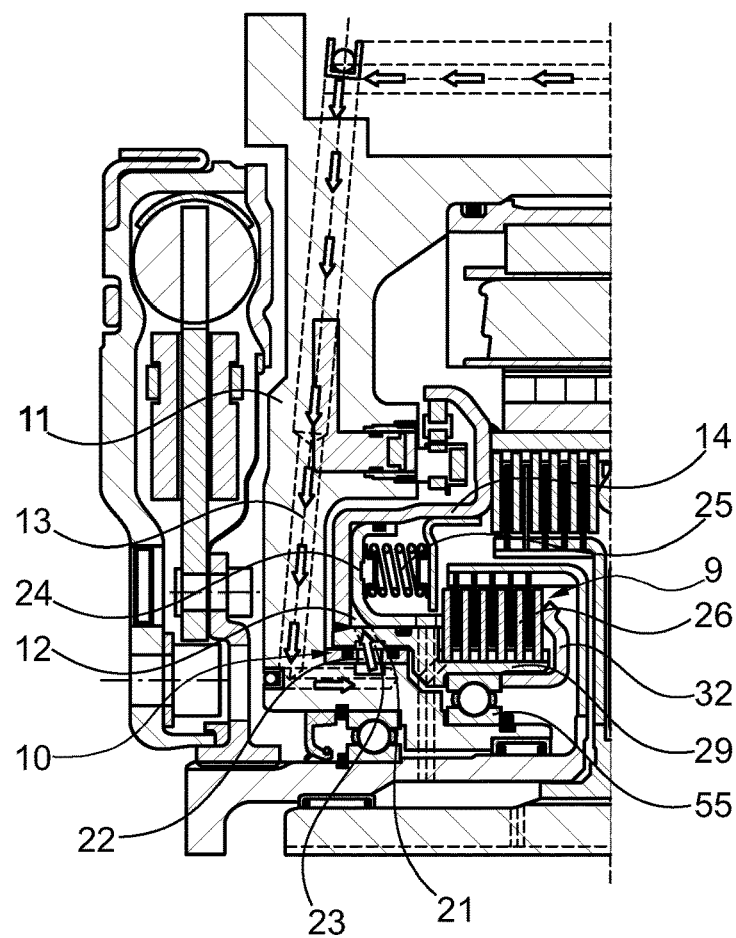
FIG. 2 is a view equivalent to FIG. 1 of the hybrid module and a path for actuating oil for actuation of a disconnect clutch in a housing.
Figure 3:
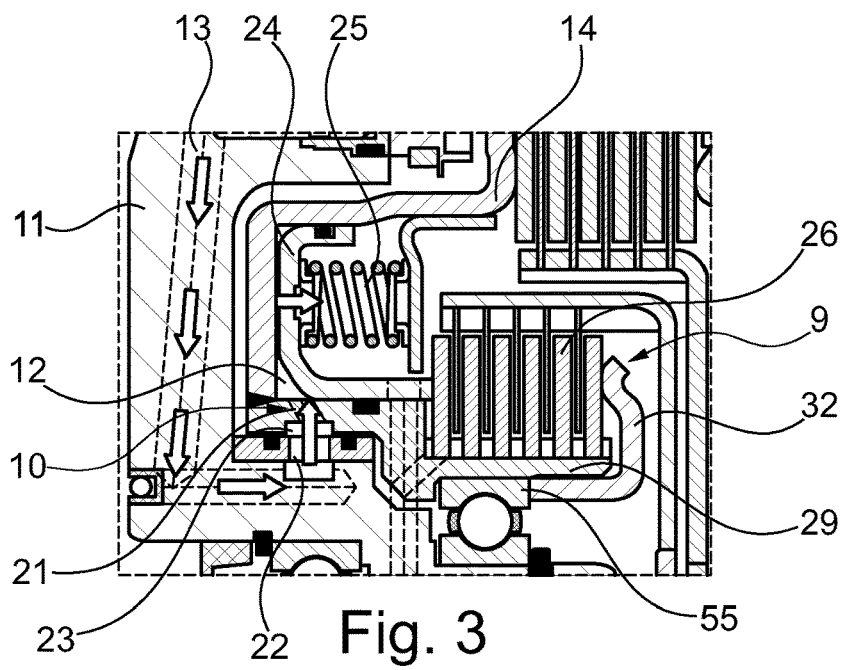
FIG. 3 is a view equivalent to FIG. 1 of the hybrid module and the path for the actuating oil for actuation of a disconnect clutch in the housing and a rotor flange.

FIGS. 2 and 3 show the path of the actuating oil for actuation of the disconnect clutch 9. The actuating oil is conveyed through the channel 13 in the housing 11, through the through-hole 22 in the sleeve 17, through the circumferential groove 23 in the rotor flange 14, through the first actuating oil rotary feedthrough 10 in the rotor flange 14 into the first pressure chamber 12, in order to displace the first actuating element 24 against the restoring force of the first spring element 25. The clutch plates 26 are thereby pressed together and the disconnect clutch 9 is closed. The actuating force is transmitted via the support bolt 32 to the inner disk carrier 29 connected to the rotor flange 14, so that the support bearing 55 is excluded from the force flow of the actuating force.

Figure 4:
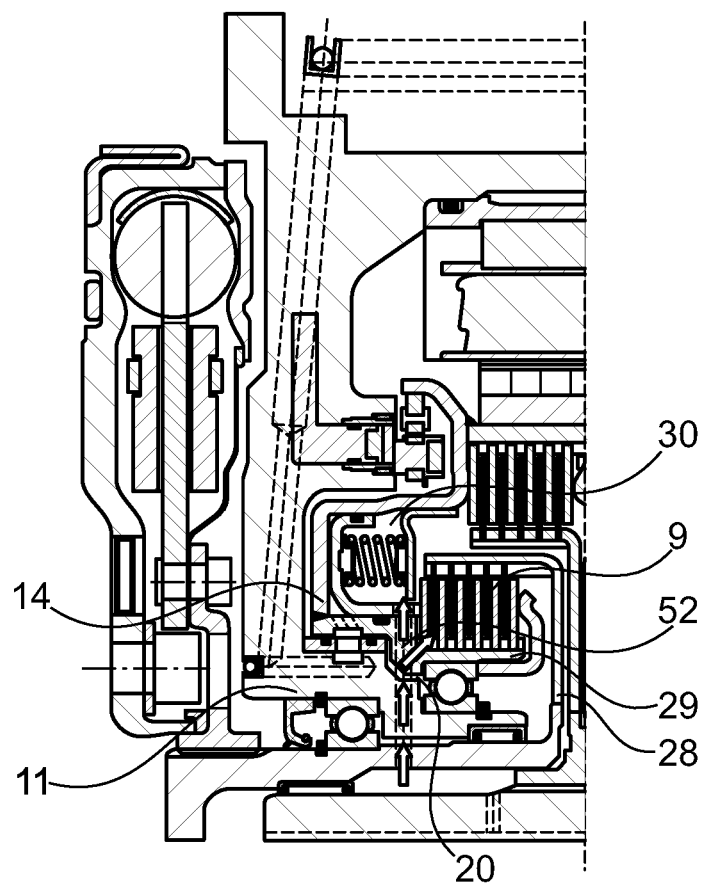
FIG. 4 is a view equivalent to FIG. 1 of the hybrid module and a path for cooling oil for cooling the disconnect clutch.
Figure 5:
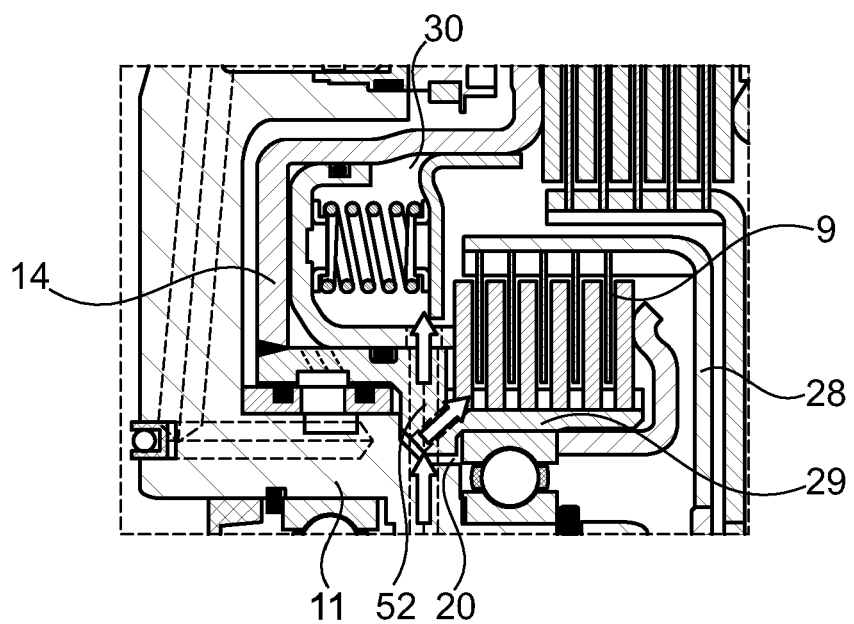
FIG. 5 is an enlarged view of a detail of FIG. 4.

FIGS. 4 and 5 show the path of the cooling oil which is used to cool the disconnect clutch 9 and to fill the centrifugal oil compensation chamber 30. The cooling oil is conveyed through the outer disk carrier 28, through the housing 11 into the housing interior 20 and from there via the cooling oil rotary feedthrough 52 in the rotor flange 14, or the inner disk carrier 29, to the disconnect clutch 9 and into the centrifugal oil compensation chamber 30.

LIST OF REFERENCE NUMERALS 1 hybrid module
2 dual clutch
3 first sub-clutch
4 second sub-clutch
5 first drive unit
6 electric machine
7 first drive shaft
8 second drive shaft
9 disconnect clutch
10 first actuating oil rotary feedthrough
11 housing
12 first pressure chamber
13 channel
14 rotor flange
15 rotor carrier
16 rotor
17 sleeve
18 seal holder
19 seal
20 housing interior
21 through-hole
22 through-hole
23 groove
24 first actuating element
25 first spring element
26 clutch plate
27 multi-disk clutch
28 outer disk carrier
29 inner disk carrier
30 first centrifugal oil compensation chamber
31 counterpressure element
32 support bolt
33 second actuating oil rotary feedthrough
34 third actuating oil rotary feedthrough
35 housing portion
36 second pressure chamber
37 third pressure chamber
38 second actuating element
39 second spring element
40 clutch plates
41 multi-disk clutch
42 outer disk carrier
43 inner disk carrier
44 second centrifugal oil compensation chamber
45 third actuating element
46 third spring element
47 clutch plates
48 multi-disk clutch
49 outer disk carrier
50 inner disk carrier
51 third centrifugal oil compensation chamber
52 cooling oil rotary feedthrough
53 rotor position locator sensor
54 rotor position locator
55 support bearing
56 housing intermediate wall
57 first roller bearing
58 second roller bearing
59 clutch housing

The invention claimed is:

1. A hybrid module for a drive train of a motor vehicle, comprising: a dual clutch including a first sub-clutch and a second sub-clutch having a common outer disk carrier connected to a rotor carrier and configured for selectively transmitting torque from a first drive unit to a drive shaft, and a disconnect clutch for coupling a second drive unit and for transmitting torque from the second drive unit to the drive shaft, wherein at least one rotary feedthrough is provided which is configured on one hand for conveying actuating oil, which is designed for actuation of the disconnect clutch, or on the other hand for conveying cooling oil, which is designed for cooling at least one of the disconnect clutch and the dual clutch, wherein there is present both for the disconnect clutch and also for the first sub-clutch and the second sub-clutch in each case a rotary feedthrough for conveying actuating oil for actuation of the disconnect clutch, the first sub-clutch and the second sub-clutch, wherein a counterpressure element for supporting an actuating force for actuation of the disconnect clutch, the first sub-clutch or the second sub-clutch is fixedly connected to a rotor flange which is fixedly connected to the rotor carrier.

2. The hybrid module as claimed in claim 1, wherein the rotary feedthrough for conveying actuating oil for actuation of the disconnect clutch is formed in a housing and the rotor flange.

3. The hybrid module as claimed in claim 2, wherein the rotary feedthrough for conveying actuating oil for actuation of the disconnect clutch is formed by a through-hole in the rotor flange which is connected via a radially circumferential groove to an actuating oil inlet in the housing.

4. The hybrid module as claimed in claim 3, wherein the groove is connected via a through-hole in a sleeve to the actuating oil inlet in the housing.

5. The hybrid module as claimed in claim 1, wherein the disconnect clutch is in the form of a multi-disk clutch, wherein an inner disk carrier is fixedly connected to a rotor flange.

6. The hybrid module as claimed in claim 1, further comprising at least one oil-filled centrifugal oil compensation chamber which is so configured that an oil pressure in the centrifugal oil compensation chamber applies a force in an axial direction to an axially displaceable actuating element for actuation of the disconnect clutch, the first sub-clutch or the second sub-clutch, which force counteracts an actuating force of the actuating oil for actuation of the disconnect clutch, the first sub-clutch or the second sub-clutch.

7. The hybrid module as claimed in claim 6, wherein the oil pressure in the centrifugal oil compensation chamber corresponds to an actuating oil pressure in a pressure chamber which is filled with actuating oil for actuation of the disconnect clutch, the first sub-clutch and the second sub-clutch.

8. The hybrid module as claimed in claim 1, wherein the counterpressure element is in the form of a support bolt, a retaining ring or a bayonet ring.

\* \* \* \* \*